United States Patent [19]
Bader et al.

[11] Patent Number: 4,514,840
[45] Date of Patent: Apr. 30, 1985

[54] DATA TRANSMISSION SYSTEMS FOR FULL DUPLEX COMMUNICATION

[75] Inventors: Edgar Bader, Rueckersdorf; Gerd Rohrbach; Jürgen Petersen, both of Nuremberg; Ludwig Kittel, Heroldsberg, all of Fed. Rep. of Germany

[73] Assignee: Te Ka De Felten & Guilleaume Fernmeldeanlagen GmbH, Nuremberg, Fed. Rep. of Germany

[21] Appl. No.: 454,478

[22] Filed: Dec. 29, 1982

[51] Int. Cl.$^3$ .............................................. H04J 3/06
[52] U.S. Cl. ...................................... 370/29; 370/100
[58] Field of Search .................. 370/29, 100; 375/118

[56] References Cited

U.S. PATENT DOCUMENTS 3,967,058  6/1976  Moriya et al. ........................ 370/29
4,086,429  4/1978  Kotezawa et al. .................... 370/29
4,208,724  6/1980  Rattlingourd ....................... 375/118

FOREIGN PATENT DOCUMENTS 2453628  10/1980  Fed. Rep. of Germany .

Primary Examiner—Douglas W. Olms
Attorney, Agent, or Firm—Michael J. Striker

[57] ABSTRACT

Disclosed is a full duplex communication system connecting by a two wire link a main station and a local station. Both the main station and the local station has a clock pulse generator. The local clock pulse generator is switchable between a pulse rate which corresponds to that of the main clock and another pulse rate which defers about a fixed value. A comparator compares the phase of the incoming signal with the local clock signal and switches the local clock generator when its output is out of phase with the received signals.

3 Claims, 2 Drawing Figures

4,514,840

DATA TRANSMISSION SYSTEMS FOR FULL DUPLEX COMMUNICATION

BACKGROUND OF THE INVENTION

The present invention relates in general to a duplex communication system and in particular to a duplex transmission system employing a two-wire link between a main station and a local station, the main station generating a clock signal whereby the coded data signal is transmitted during one half period of the main clock signal from the main station to the local station and during the other half period the coded data signal is transmitted from the local station to the main station.

A data transmission system of this type is known from the German Pat. No. 2,453,628. Such systems are employed for signal transmission over short distances and for a short duration of transmission. The two-wire link transmits in rapid direction exchange alternately from the main station to the local one and vice versa, information contained in a single signal step such as one bit, one dibit, or one tribit. The data transmission code is selected such that in the local station the rate or period of the main clock signal can be detected so that the local station is synchronized with the main station.

In the prior system according to the German Pat. No. 25 53 628 no active clock generator is present in the local station. As a consequence in the event of an interruption in the link, the local station is without clock signals.

Moreover, in the prior art system, the main station transmits to the local station a bipolar RZ (return to zero) signal and from the local station to the main station a unipolar RZ signal is transmitted. Most transmitted signals are scanned or sensed as to their timing by means of NRZ (non-return to zero) signals. In the RZ signals there is no possibility to achieve a transmission without direct current components.

SUMMARY OF THE INVENTION

A general object of the present invention is to overcome the disadvantages of prior-art systems of this kind.

More particularly, it is an object of this invention to provide an improved duplex transmission system of the aforedescribed kind in which the local station generates clock pulses independently from the main station whereby the rate or period of the received signals is promptly synchronized with the clock signals in the main station.

In keeping with these objects and others which will become apparent hereinafter, one feature of the invention resides in providing the local station with a separate local clock pulse generator which is switchable to generate a first local clock signal at a period corresponding to that of the main clock signal, and a second local clock signal the period of which differs from the rate of the main signal about a fixed amount, means for comparing the phase of the received coded data signal with one of the local clock signals, and means for switching over the local pulse generator when the received data signal is out of phase with the one local clock signal.

By virtue of the active clock signal generator in the local station it is insured that corresponding terminal apparatus in the local station is always properly clocked. During the reception of the main data signal it is synchronized with the main clock signal and in the case of an interruption of the transmission link it is still timed by a clock signal which may differ from that of the main station but which immediately upon the receipt of the main signal is promptly synchronized with the latter.

The novel features which are considered as characteristic for the present invention are set forth in particular in the appended claims. The invention itself, however, both as to its construction and its method of operation, together with additional objects and advantages thereof, will be best understood from the following description f specific embodiments when read in connection with the accompanying drawings.

DESCRIPTION OF THE PREFERRED EMBODIMENTS

Figure 1:
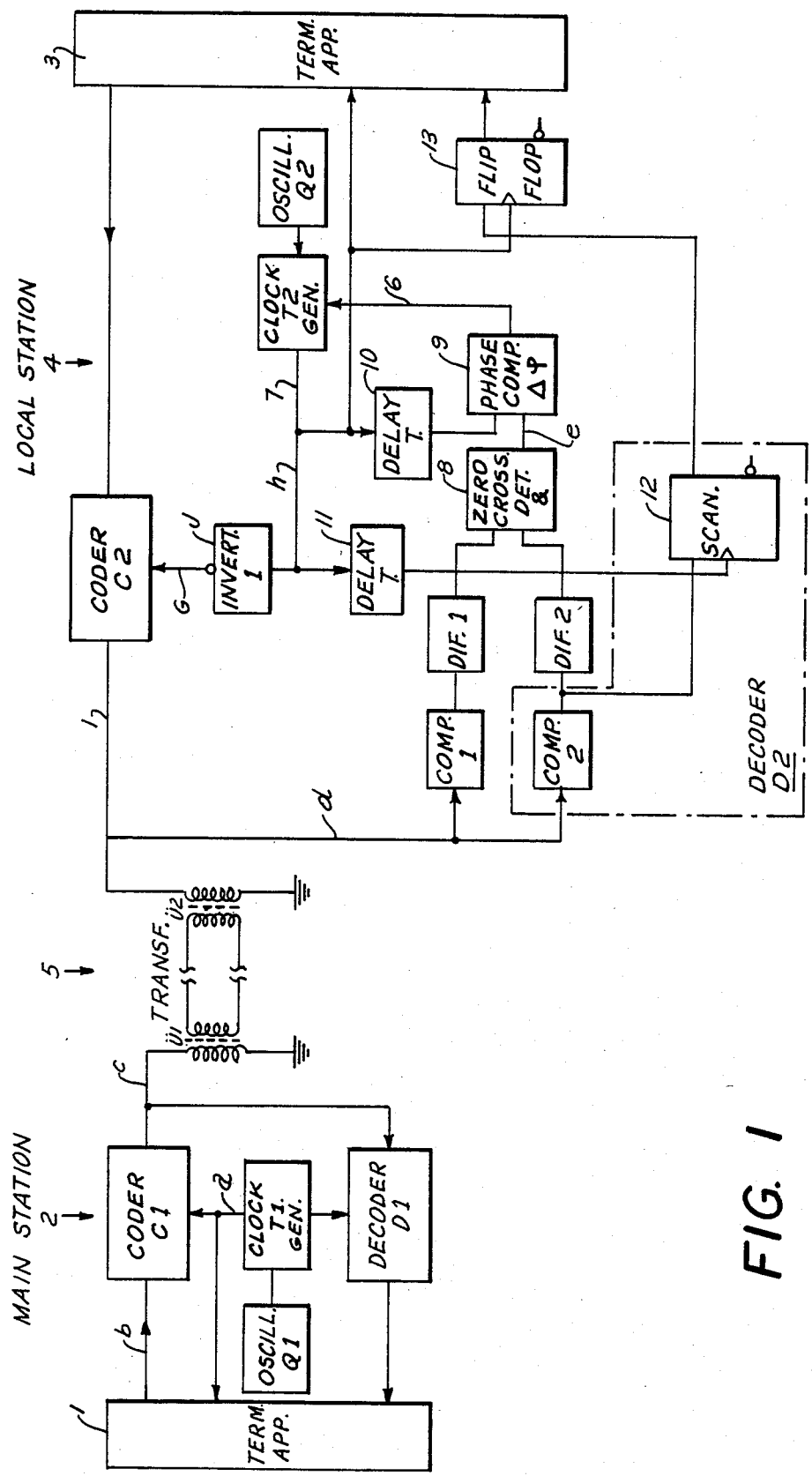
FIG. 1 is a block diagram of a data transmission system according to this invention.

Referring firstly to FIG. 1, a terminal apparatus 1 is associated with a main station 2 and the terminal apparatus 3 is connected to a local station 4. The terminal apparatus in each station may be for example a Teletex device. The main station 2 is connected to the local station 4 by a two wire link 5 which is relatively short, for example within the range of a building.

The main station 2 is provided with a clock pulse generator P1 controlled by a quartz oscillator Q1 to generate a main transmission clock signal a, which is applied to a coder C1 and to a decoder D1. Coder C1 recieves from the terminal apparatus 1 data signal b (FIG. 2b) to be transmitted and converts the same into a coded transmission signal c (FIG. 2c) which is supplied to a transformer U1 connected at one end of the two wire links 5. The transformer U1 is also connected to the input of the decoder D1 which decodes received signal and supplies the decoded data to the terminal apparatus 1.

The local station 4 has also a coder C2 which processes data signals from the terminal apparatus 3 in the same manner as coder C1 in the main station and generates a local data transmission i (FIG. 2i) which is applied to the other transformer U2 at the transforming end of the link 5. According to this invention, local station 4 is provided with its own clock generator which in this example includes quartz oscillator Q2 operating at a nominal frequency of 4.6 megacycles for instance; the output of oscillator Q2 is connected to time clock generator P2 which includes a switchable divider of the incoming signal. The divider divides the frequency by $n-1$ or $n+1$ depending on the signal at its switching input X and the resulting reception clock signal h (FIG. 2h) is applied to the output 7. n indicates the ratio between frequencies of the local oscillator Q2 and the local clock signal h. The local or reception clock signal h is inverted in inverter J and is applied as a local transmission clock signal g to the coder C2.

The local station 4 further includes two comparators K0 and P1 and K0 and P2 connected in parallel to the transformer U2. One of the comparators rectifies and limits in amplitude the positive components, and the other comparator the negative components of the received coded signal d. Differentiators DIF1 and DIF2 are connected to the outputs of corresponding comparators and the output signals from the differentiators are applied to inputs of an AND-gate 8. The output of AND-gate 8 thus produces a zero crossing signal e (FIG. 2e) which is applied to one input of comparator 9. The other input of comparator 9 is supplied with comparison clock signals f (FIG. 2f) produced in a delaying circuit 11 from reception clock signal h. The output of phase comparator 9 is connected to the switching input 6 of the clock pulse divider P2. If now the received signal d is present or if signals e and f do not coincide in time, then the signal generated at the output of comparator 9 switches the local clock pulse generator P2 to a dividing ratio n+1 or alternatively when the signals e and f coincide, to a ratio n−1.

The output 7 of local clock pulse generator 2 is directly connected to the terminal apparatus 3. Comparator KOMP2 together with an additional delay stage 11 and step feeler 12 form a decoder D2 of the local station 4. The step feeler 12 is controlled by the reception clock signal from the output 7 via the additional delay stage 11. The sensed step values from the output of feeler 12 are applied to a set input of a flip-flop 13 which is controlled by the reception clock signal h.

The operation of the duplex system of this invention is as follows:

The main transmission clock signal a has a rate or clock period $T_A$ and a key or step ratio of 50%. During the high (H) or "1" signal steps of the signal a coder C1 is active and decoder D1 is blocked. Vice versa, during the low (L) or "0" signal steps coder 1 is closed and decoder 1 is active.

Figure 2:
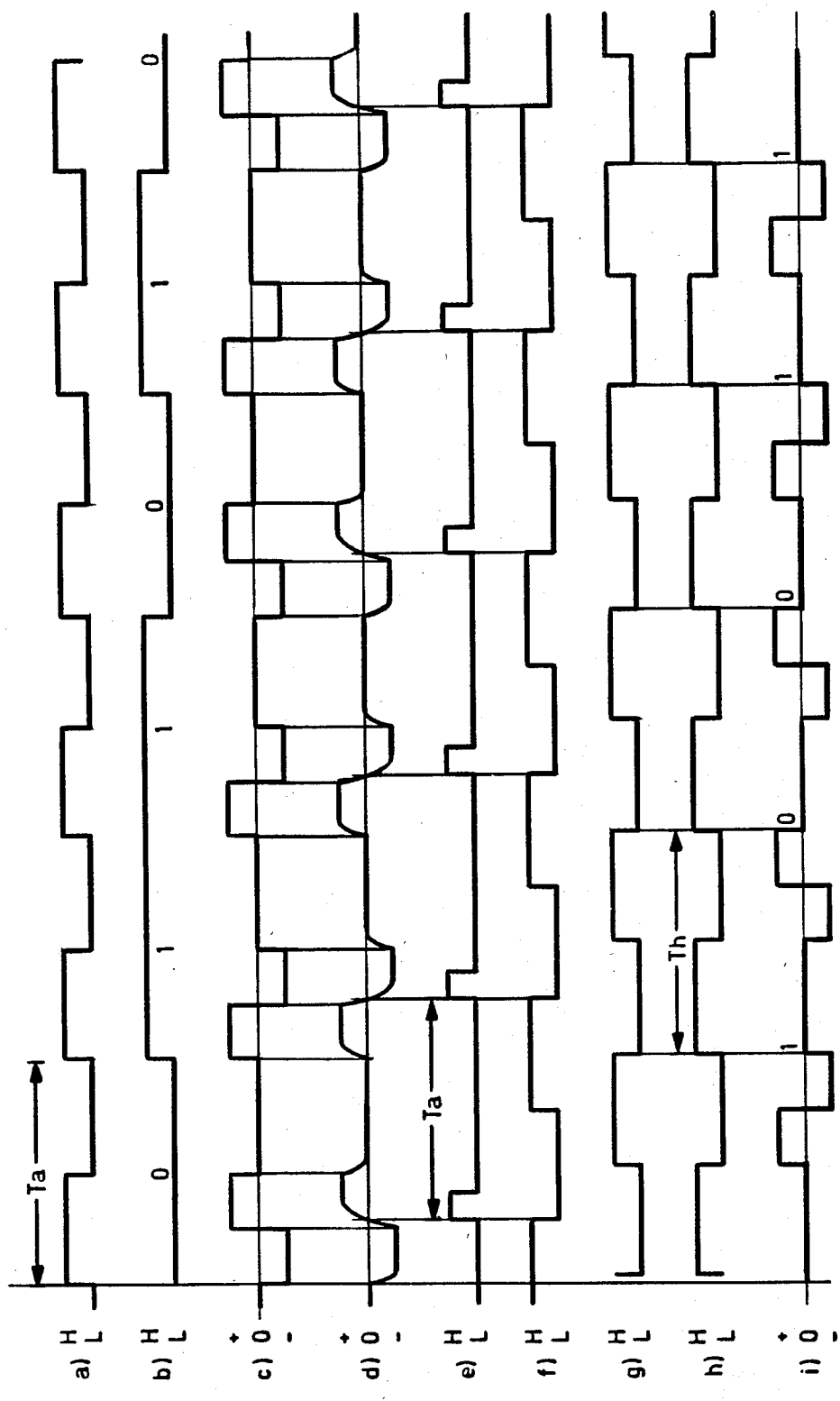
FIG. 2 is a time plot of respective signals occurring in the system of FIG. 1.

FIG. 2b shows by way of an example an NRZ-signal "0,1,1,0,1" representing information to be transmitted. The data b during the "1" stage of the main clock signal a are converted in coder C1 in the coded transmission signal c which has no DC component. In the coded signal c, each period of the signal c thus consists of a negative and a positive signal component whereby in the case of a "0" information in signal b the negative component trails the positive component; in the case of "1" information in signal d the positive component is behind the negative component (FIG. 2c).

The main coded transmission signal c after passage through the two wire link 5 is received in the local station as a receipt signal d from which the zero crossing signals e are derived in the manner described before. As it will be seen from FIG. 2e the period of signals e is the same as that of the main clock signal a. The reception clock signal h the momentary rate or clock period of which is indicated as PH is to be synchronized with the zero crossing signals e. For this purpose a comparison clock signal f is derived from the reception clock signal h by means of the delay stage 10 and the phase of the falling flank of the signal f is compared with the rising flank of the zero crossing signal e. The rising flank of the signal e is delayed about a quarter of clock period $T_A$ with respect to the rising flank of the main clock signal a. In order to compensate for this phase difference the falling flank of the comparison signal f is delayed about the same amount in delay stage 10 so that the proper relationship with respect to the zero passage signal e be established. If signal f overlaps the signal e, then the divider T2 is switched over to divide by the ratio n−1 whereby n is 384 for example. If now overlap is present between signals e and f, then the dividing ratio of clock generator T2 is switched over to n−1. Consequently, the falling flank of the comparison signal f oscillates about the rising flank of the signal e until the clock signal of the local station 4 at the output 7 catches the main clock signal a of the main station 2. The local transmission signal g is inverted relative to the reception clock signal h and thus to the main transmission clock signal a. Accordingly, if coded signal i to be transmitted is coded with information derived from the terminal apparatus 3 which may be for example "1,0,0,1,1" then the signal is transmitted when coder C1 in the main station is blocked and decoder D1 is active.

The delay stage 11 delays the reception clock signal h about ⅜ of the clock pulse period TH so as to insure an optimum step sensing operation of the sensor 12, that means at larger time gaps.

As long as no received signal d is present at the local station 4, the local clock signal generator T2 operates at a dividing ratio n+1. As a consequence, a relatively large deviation of the clock period $T_H$ relative to the main clock period $T_A$ is produced. The phase of the comparison clock pulse signal f for a very short time is a out of phase as to the period $T_A$. As soon as a signal d is received and the zero crossing signals e are generated, a time point is promptly reached at which the falling flank of the signal s coincides with the rising flank of the signal e and the desired synchronization between the main and local clock signals is achieved.

It will be understood that each of the elements described above, or two or more together, may also find a useful application in other types of constructions differing from the types described above.

While the invention has been illustrated and described as embodied in a specific example of a full duplex communication system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims:

1. A data transmission system for a full duplex communication via a two wire link between a main station and a local station, the main station generating a main clock signal whereby during one half period of the main clock signal a coded data signal is transmitted from the main station to the local one and during the other half period the coded data signal is transmitted from the local station to the main station, said local station comprising a separate local clock pulse generator switchable between a mode of operation in which it generates a first local clock signal having a period corresponding to that of the main clock signal, and another mode of operation in which it generates a second local clock signal the period of which differs from that of the main signal by a fixed amount; means for comparing the phase of the received coded data signal with one of the local clock signals and for switching over the operational modes of the local clock pulse generator when the received coded data signal is out of phase with the one local clock signal.

2. A data transmission system as defined in claim 1, wherein said local clock pulse generator includes an oscillator and a divider controlled by said comparing means to switch over from a dividing ratio n+1 to a dividing ratio n−1.

3. A data transmission system as defined in claim 1, wherein said comparing menas include means for detecting zero crossing of the received signal and a delay stage connected to the output of said local clock pulse generator to compare the phase of zero crossings of the received signal with the local clock signal.

* * * * *